(No Model.)

A. E. SMITH.
VEHICLE AXLE.

No. 281,310. Patented July 17, 1883.

WITNESSES:

INVENTOR

UNITED STATES PATENT OFFICE.

ALFRED E. SMITH, OF BRONXVILLE, NEW YORK, ASSIGNOR TO THE ALFRED E. SMITH AND WARNER AXLE COMPANY, OF DELAWARE.

VEHICLE-AXLE.

SPECIFICATION forming part of Letters Patent No. 281,310, dated July 17, 1883.

Application filed January 9, 1883. (No model.)

*To all whom it may concern:*

Be it known that I, ALFRED E. SMITH, of Bronxville, in the county of Westchester and State of New York, have invented a new and useful Improvement in Axles for Vehicles, of which the following is a specification.

My invention relates to a mode of securing axles of vehicles in the axle-box and keeping the same tight therein; and it consists in constructing the outer end of the axle in such a manner that, in connection with the axle-box and a catch or washer, there will be a constant bearing of the extreme end of the axle against the inner surface of the binding-nut at a point beyond the washer, so as to secure evenness of wear of the latter and prevent rattling of the parts.

Figure 1:
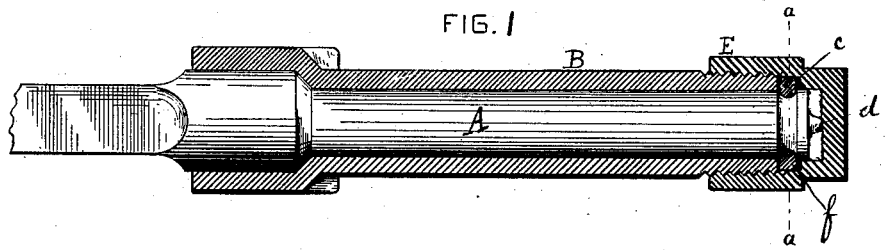
Figure 2:
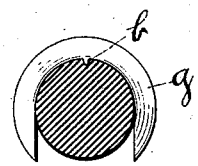
Figure 3:
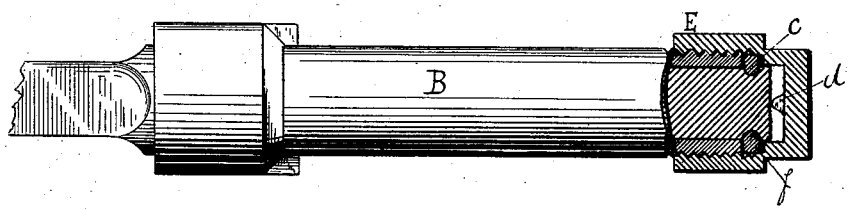

In the accompanying drawings, Figure 1 represents a cross-section through the center of an axle-box, a binding screw-cap, and a revolving catch or washer, and a longitudinal view of an axle with its annular groove; Fig. 2, an end view of the washer and axle; Fig. 3, a longitudinal view of the axle-box and a section through the line $a\,a$, Fig. 1, of the axle, washer, and screw-cap.

The axle A is usually constructed with an enlarged bearing at its inner end, and on that part of its outer end which projects beyond the outer end of the axle-box is an annular groove, $f$, followed by a projecting cylindrical end, which may be provided with a small round projection or knob, $d$, as shown in Fig. 1, or may be flat and abut against a similar teat or knob on the inner surface of the nut, as shown in Fig. 3. Into the annular groove is fitted a revolving catch or washer, $g$, (shown in Fig. 2,) which may be provided with a pin, $b$, fitting into a small hole in the groove, if it is preferred to have the washer stationary, and which pin keeps it from falling out when the nut is removed. A binding screw cap or nut, E, cylindrical on its inner surface, and provided with an internal screw-thread, receives the extreme end of the axle and affords a small end bearing-surface for the axle. The axle-box B conforms in shape at the inner end to the axle, which is inserted within it. Thus the outer end of the axle will project beyond the box at the inner side of the annular groove $f$, into which is fitted the revolving catch or washer $g$, which I prefer should have flat sides and be of a size to fit snugly within the nut. One of the sides of the washer bears against the outer end of the axle-box, and is secured in place by the binding screw-cap, which thus holds the whole together. A small space, $c$, is left between the sides of the washer and the nut, and the axle-box is provided with additional screw-threads to allow of taking up wear of the washer. It will thus be seen that when the latter wears in thickness there will be a constant bearing of the axle against the nut, thus preventing a rattling of the parts, and the cylindrical shape of the outer end of the axle and the inner surface of the nut enables the latter to be screwed up tight on the axle-box as the washer wears down.

It is apparent that the end bearing of the axle against the nut may be as described and shown in Fig. 1; or the parts reversed, as in Fig. 3; or the end bearing of the axle may be flat, the surface of the nut being flat also. This particular shape is shown in the drawings as producing less friction.

Having thus described my invention, what I claim as new, and desire to secure by Letters Patent, is—

1. An axle for vehicles, constructed with a cylindrical outer end projecting beyond the axle-box, and provided with an annular groove, in combination with a revolving catch or washer bearing against the outer end of the axle-box, a binding screw-cap of cylindrical shape internally and provided with a bearing-surface to abut against the axle at a point beyond the washer, and an axle-box with a screw-threaded end to receive the cap-nut, all substantially as set forth.

2. The stationary catch or washer provided with a pin, in combination with an axle having an annular groove on its outer end and provided with a recess to receive the pin of the washer, as set forth.

In testimony whereof I have hereunto set my hand in the presence of witnesses.

ALFRED E. SMITH.

Witnesses:
ROBERT J. OWEN,
FRANCIS S. BROWN.